Figure 1:
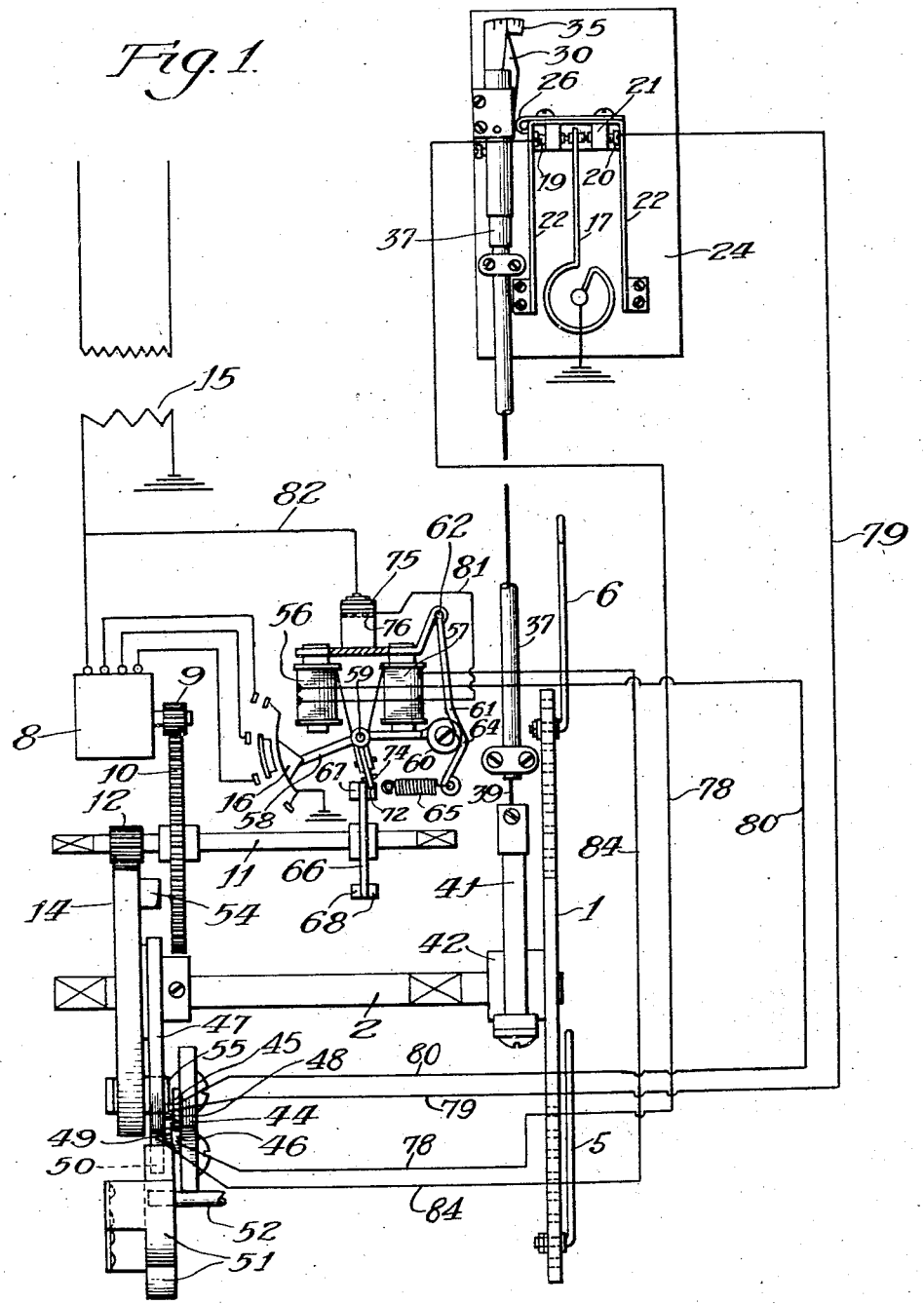

July 2, 1940.  L. HOLLAND-LETZ  2,206,566
AUTOMATIC REGULATOR FOR HEATING APPARATUS AND THE LIKE
Filed June 14, 1937  4 Sheets-Sheet 1

Inventor:
Ludwig Holland-Letz
By: Wm. F. Freudenreich
Attorney

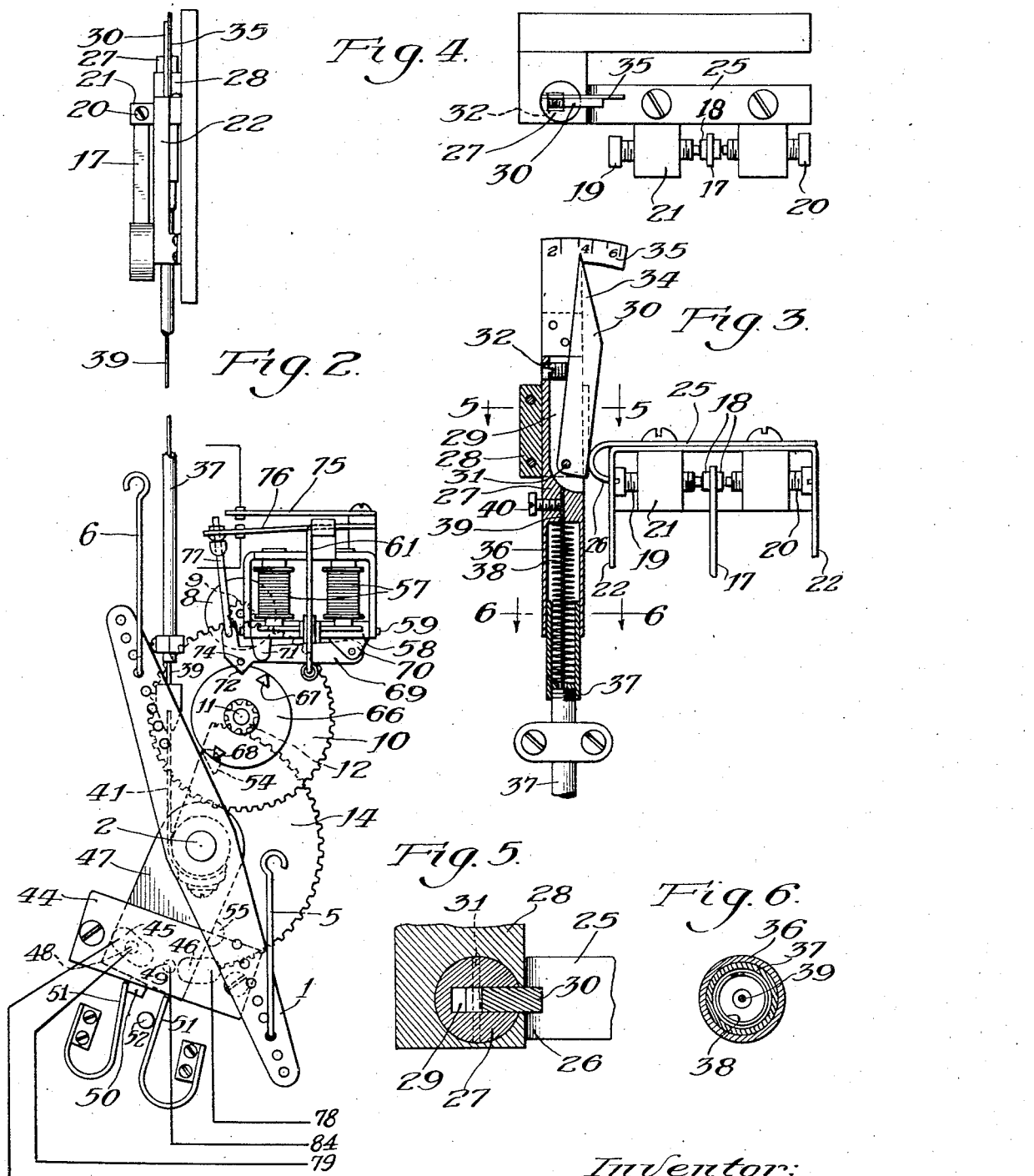

July 2, 1940.  L. HOLLAND-LETZ  2,206,566
AUTOMATIC REGULATOR FOR HEATING APPARATUS AND THE LIKE
Filed June 14, 1937  4 Sheets-Sheet 3
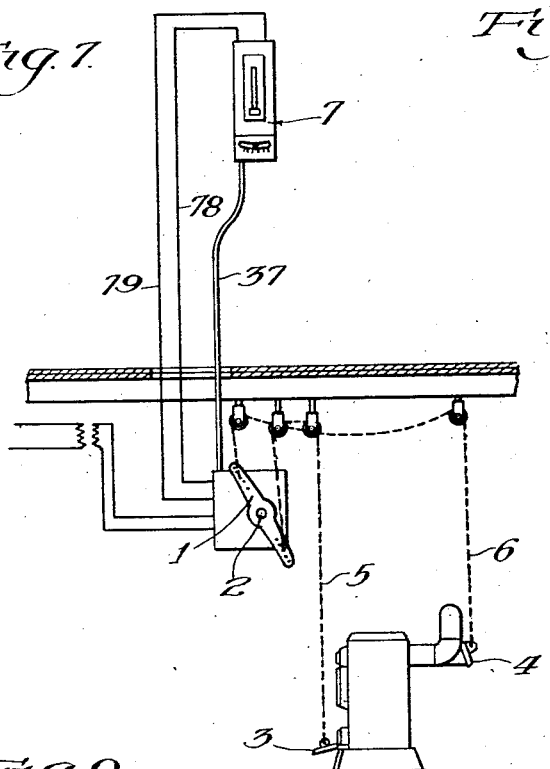
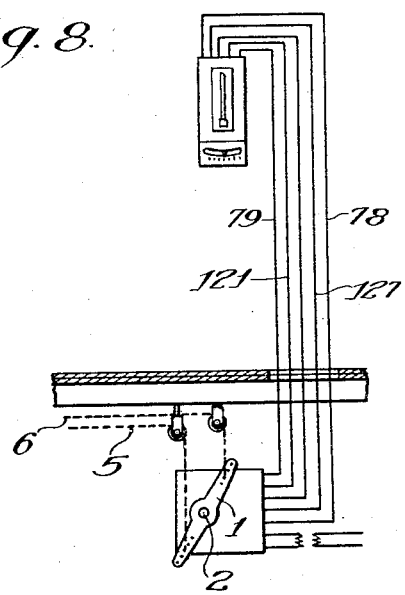
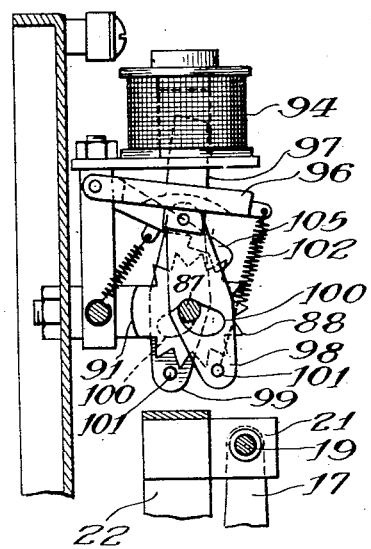
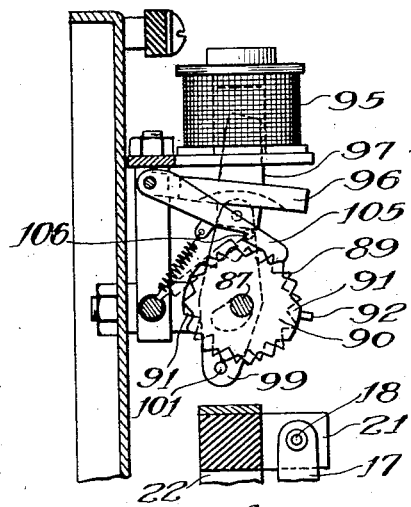
Inventor:
Ludwig Holland-Letz
By: Wm. F. Freudenreich,
Attorney July 2, 1940.  L. HOLLAND-LETZ  2,206,566
AUTOMATIC REGULATOR FOR HEATING APPARATUS AND THE LIKE
Filed June 14, 1937  4 Sheets-Sheet 4

Inventor:
Ludwig Holland-Letz.
By: Wm F. Freudenreich
Attorney

Patented July 2, 1940

2,206,566

UNITED STATES PATENT OFFICE 2,206,566

AUTOMATIC REGULATOR FOR HEATING APPARATUS AND THE LIKE

Ludwig Holland-Letz, Crown Point, Ind.

Application June 14, 1937, Serial No. 148,091

16 Claims. (Cl. 236—76)

In the usual types of heating plants for homes, offices and other buildings, burning hard fuels, the generation of heat is regulated by draft and check damper devices. Where these devices have been controlled automatically, the result has been simply to open or close them, thereby giving only very poor regulation of the fire. Furthermore, in plants where there must be stored up a large amount of heat energy before the thermostat in a room to be heated will be affected, the heat energy thus stored up continues to act after the thermostat has exercised its controlling function, and the temperature of the room rises far above that for which the thermostat is set. A further objection to these old forms of automatic control is that there can be no close regulation of room temperature because of the large gap between the minimum temperature that is reached before an effective inflow of heat occurs, and the maximum temperature when the final surge of stored heat energy is released into the room long after the thermostat has acted; this being particularly true in the case of hot water heating systems where there are large masses of water and metal that are alternately heated and cooled as the fire is increased and lessened.

The object of the present invention is to produce a simple and novel controlling system for overcoming the aforesaid objections and making possible the maintenance of a substantially steady or uniform temperature.

In carrying out my invention, as applied to the aforesaid types of heating apparatuses, I provide means for opening and closing the draft and check devices, step by step, so that the draft and check devices may be adjusted as rapidly as is desirable into the most effective positions under any given set of conditions, and be arrested in such positions until the need or desirability of adjustment either in the forward or backward direction arises.

Therefore, viewed in one of its aspects, the present invention may be said to have for its object to produce a simple and novel thermostatic control, not only of heating plants, but in other situations where it is desirable that there be a flexibility of control determined by a temperature condition; as, for example, for the purpose of regulating steam supply lines for heating or oven purposes, for varying the speed of automatic stokers, and for many other heating uses.

Figure 12:
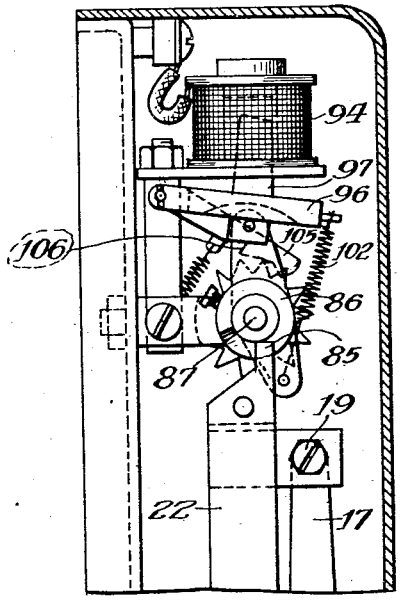
Figure 11:
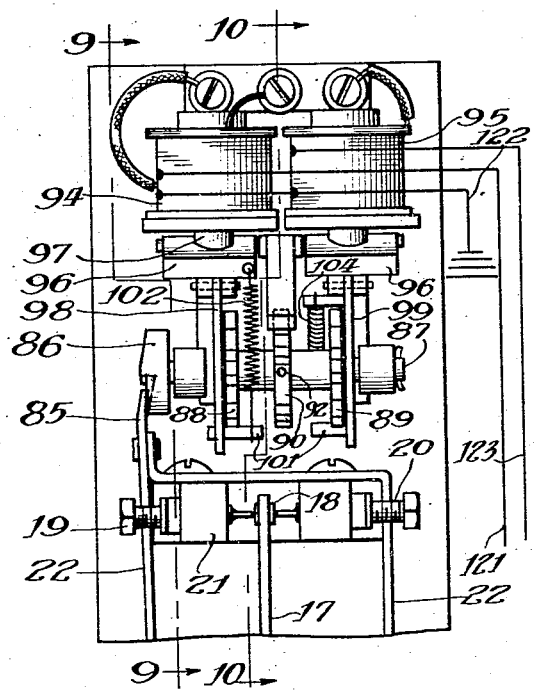
Figure 13:
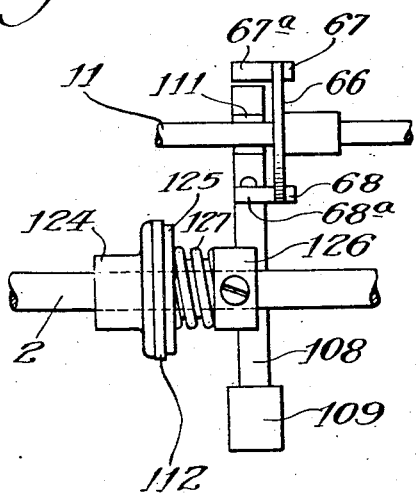
Figure 14:
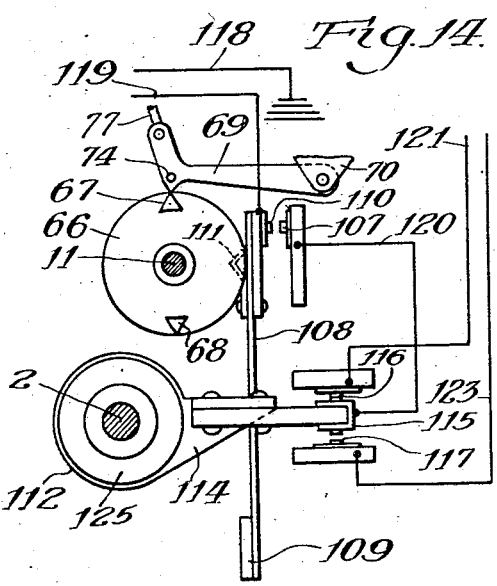

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a more or less diagrammatic view of a system embodying the present invention; Fig. 2 is an end or side view of the mechanical elements illustrated in Fig. 1; Fig. 3 is a view, on an enlarged scale, showing, partly in elevation and partly in section a fragment of the thermostat, together with the contact terminals associated therewith and controlling means for said contact terminals; Fig. 4 is a top plan view of the parts shown in Fig. 3; Fig. 5 is a section on a still larger scale on lines 5—5 of Fig. 3; Fig. 6 is a section on line 6—6 of Fig. 3; Fig. 7 is a diagram illustrating the application of the mechanism illustrated in Figs. 1 to 6 applied to a boiler or furnace having draft and check damper devices; Fig. 8 is a view similar to Fig. 7, with the boiler or furnace omitted, illustrating a system in which there are no mechanical connections between the thermostatic devices and the parts to be controlled thereby; Figs. 9 and 10 are vertical sections through a thermostatic device of the type employed in the system illustrated in Fig. 8, these sections being taken respectively on lines 9—9 and 10—10 of Fig. 11; Fig. 11 is a front view of an electro-magnetic controlling means for the contact terminals cooperating with the thermal element of the thermostat in the system illustrated in Fig. 8; Fig. 12 is a side or edge view of the parts shown in Fig. 11, with the addition of a cover or housing shown in section; Fig. 13 is a front view of mechanism to be applied to the immediate draft and check damper operating devices in Fig. 1 where the contact terminals cooperating with the temperature sensitive element are to be controlled electro-magnetically, as in Figs. 9 to 12; and Fig. 14 is a side or end view of the parts shown in Fig. 13, together with associated elements and parts of a wiring diagram.

Referring to Fig. 7 of the drawings, I represents a rocker beam fixed at the middle to a supporting shaft 2 and having its ends connected to a draft door 3 and a check damper 4 by chains 5 and 6 or other suitable flexible elements; this being a conventional way of operating draft doors and check dampers. The operation of the shaft 2 is controlled by a thermostat, indicated as a whole at 7. The details of the means for actuating and controlling the shaft 2 are illustrated in Figs. 1 to 6.

Referring to Figs. 1 to 6, it will be seen that the shaft 2 is oscillated by a reversing motor 8 through speed reduction gearing. Thus, the motor shaft has thereon a pinion 9 that meshes with a large gear wheel 10 on a shaft 11 parallel with the shaft 2. The shaft 11 has thereon a pinion 12 meshing with a large gear segment 14 fixed to the shaft 2. Current is supplied to the motor through the secondary of a transformer 15 through a reversing switch 16. Assuming that the reversing switch has three positions, namely forward, reverse and neutral, it will be seen that by properly shifting the switch, the rocker beam 1 may be swung in either direction through any desired angle and be brought to rest at the limit of such movement.

The switch is controlled by a thermostatic device containing any usual or suitable temperature responsive member which, in the arrangement shown, is a bimetal strip anchored at one end and having a long free arm 17 that swings back and forth as its temperature increases and decreases. The thermal element is shown as being grounded at one end, as is also one terminal of the transformer secondary 15. The free end of the member 17 has little projections 18 on opposite sides, constituting the movable contacts of a switch device. The contact pieces 18 lie between and in alignment with a pair of aligned screws 19 and 20; these screws being in a suitable body 21 of insulating material arranged between the upper ends of and carried by a pair of spring metal strips 22, 22 that lie on opposite sides of and approximately parallel with the arm 17. The lower ends of the elements 22 are secured to the same base or block 24 upon which the thermal element is mounted. The extreme upper ends of the arms or strips 22 are connected together by a cross piece integral with the same and forming therewith an inverted U-shaped frame anchored at its lower end. The upper end of this frame, carrying the contact screws 19 and 20, may be deflected to the right or to the left, returning when released, to its normal upright position. In this way the contact screws 19 and 20 may be shifted bodily to the right or left without coming out of line with the contacts 18 on the member 17. On top of the U frame is fixed a metal strip 25 which extends laterally beyond one side of the U frame and is there curved downwardly and inwardly to form a rounded projection 26. The screws 19 and 20 form, with the contacts 18, a double-throw switch of which the members 18 form the movable contacts and in which the screws are also movable, not only to effect an initial adjustment of the gap when the switch is open, but in order, under certain conditions, to open the circuit. The simultaneous, bodily shifting of the screws 19 and 20 in one direction is brought about by pushing laterally on the rounded projection 26; the resiliency of the spring strips or arms 22 being such that they may be deflected laterally through a limited angle without bringing the screws 19 and 20 out of alignment with the contact pieces 18. In the particular arrangement illustrated, this shifting of what may be termed the supporting frame for the terminal screws is caused by the turning of the shaft 2. It will be seen that there is supported beside the thermostatic device a vertically-slidable round rod 27; this rod extending through a stationary bearing block 28. The rod has in the upper end a deep slot 29 opening out through the side and through the top. Within this slot is positioned a short rectangular bar 30 projecting out through the slot and through the side of the bearing block 28. The outer edge of the member 30 is inclined so that when the lower part thereof engages the projection or lug 26, the upper part of the edge overhangs the same. Consequently, if the rod is pulled down, it will push the projection 26, and therefore, the upper end of the supporting frame for the screws 19 and 20 toward the right, as viewed in Fig. 3. When the rod is pushed up again, the resiliency of the arms or strips 22 causes the frame to be returned to its initial position. The part 30 is secured to the rod by a hinge pin 31 at its lower end and, extending through the bottom wall of the slot 29 behind the member 30 is a headless screw 32, the position of which determines the inclination of the outer or working edge of the member 30. The upper end of the member 30 may be sharpened to a point as indicated at 34 for cooperation with a graduated scale 35.

The lower end of the rod 27 is made tubular, as indicated at 36. This tubular part is telescoped upon a stationary tubular element 37 which extends down into the vicinity of the shaft 2. Within the upper part of the tubular member 37 and the tubular part 36 is a compression spring 38 that tends constantly to hold the rod with its wedge member 30 raised. The rod may be drawn down by a wire 39 or other suitable member extending up through the tubular members 37 and 36 and having its upper end anchored to the rod 27, as for example, by a set screw 40. The lower end of this wire is attached to a strap 41 one end of which is fastened to a hub-like portion 42 or enlargement on the shaft 2. With this construction, when the shaft 2 is turned in one direction, it winds the strap upon the hub 42 and thus pulls down the rod 27 with its wedge device. When the shaft stops, so does the movement of the rod. When the shaft turns in the opposite direction, the strap unwinds and the spring 38 is free to move the rod up far enough to take up the slack in the wire and strap.

As will hereinafter be explained, the switch device just described controls the operation of the motor, causing it to start in either direction and stop in a manner to provide an approximately uniform temperature in the room or space where the thermostat is located, after a sufficiently hot fire has once been established. The motor is controlled in two ways: first, to produce a step by step regulation of the draft and check devices; and second, to determine the direction in which the motor is to turn. The step by step operation of the draft and check devices insures a gradual variation in chimney pull on the fire, but only when and as warranted by the rise in temperature, and the maintenance of the effective chimney draft at any desired stage which is best suited to maintain the desired temperature after that temperature has been reached. The controlling of the motor for forward or reverse operation not only permits the check damper to be fully closed and the draft to be opened wide whenever occasion demands, but it enables the controlling apparatus to speed up the fire again after having partially closed the draft or partially opened the check damper. In other words, not only are the closing of the draft and the opening of the check damper effected step by step, but a status quo may be established anywhere within the range of movements of these devices, and they may at any time begin to move backwards step by step, when conditions demand it.

The two energizing circuits for the reversing switch actuating means pass through a limit switch which causes the opening of either circuit which happens to be in use whenever the shaft 2 has been turned to one or the other limit of its angular movement. This switch comprises a stationary block of insulating material 44 having thereon two stationary contact pieces 45 and 46 of elongated or oval shape, together with an arm 47 loosely hung on the shaft 2 and carrying contacts 48 and 49 which have sliding engagement, respectively, with the stationary contact pieces 45 and 46. The swinging member 47 has at its lower end a lug 50 that lies between the upper ends of a pair of spring fingers 51 anchored at their free ends to any suitable support. Between the spring fingers, toward their free ends, but clear of the lug 50, is a stationary pin 52 against both of which the spring fingers are pressed when free to do so. The parts are so proportioned that normally the spring fingers both touch the post, holding the swinging member 47 in such position that the contacts 45 and 48 engage with each other and the contact 49 engages with the contact 46.

On the gear segment 14 are two lugs 54 and 55, spaced apart a distance corresponding to the angular distance through which the gear segment and its shaft 2 are adapted to turn; the lugs being on the side toward the swinging contact carrier 47 and projecting into the plane of the latter. When the gear segment 14 approaches one limit of its movement, one of the lugs engages with the swinging member 47 and carries it along until one of the contact pieces 48 and 49 rides beyond the stationary contact with which it cooperates; while, when the gear segment approaches the other limit of its movement, the other lug engages with the member 47 and swings it in the opposite direction, causing the other of the two movable contacts 48 and 49 to leave its cooperating stationary contact. As will hereinafter be seen, the circuits are such that the one that happens to be holding the reversing switch for the motor closed, at the time the gear segment reaches either limit of its movement, is interrupted at the limit switch just described. When this occurs, the shaft is at one extreme limit of its oscillating movement and cannot be started again except to run in the opposite direction from that in which it was running when brought to a stop. When the motor stops, the gear segment is, in effect, held against turning backward, so that the spring finger 51 that has been pushed away from the post 52 cannot return the member 47 to its normal intermediate position, because this member is resting against that lug 54 or 55 that has just moved it out of the intermediate position. Consequently, the limit switch remains in the position that permits the motor to be started again, but only in the reverse direction from that which caused the limit switch to open.

The reversing motor switch 16 is actuated by two pairs of electro-magnets 56 and 57. The movable member of the switch is fixed on one end of a rocking armature 58 underlying the electro-magnets and pivotally supported, as at 59, at the middle thereof. When one pair of electro-magnets is energized, it acts on the armature to swing the switch into the forward position, while the energization of the other pair of electro-magnets causes the armature to be operated in the direction to place the switch in reverse. When all of the electro-magnets are deenergized, the switch should be in its open position which, in the arrangement shown, is midway between forward and reverse. For the purpose of holding the motor switch open when the electro-magnets are all deenergized, I provide the armature 58, on the end opposite that at which the movable part of the motor switch is mounted, with a grooved roller 60 against which bears a rod 61 hinged at its upper end to a stationary support, as at 62; having therein a V-shaped bend 64 so placed that one side or the other of the V contacts with the roller 60 in either working position of the switch; the lower or free end of the rod 61 being anchored to a stationary support through the medium of a tension spring 65. The spring 65 is powerful enough to cause the sides of the V in the rod 61 to force the roller into the lowest point of the V when the magnets are deenergized.

Means are provided to hold the switch in either of its two working positions, after having been brought there, until the motor has completed a predetermined number of revolutions. In the arrangement shown, the number of revolutions that the motor makes before stopping, after having once been started, is such that the shaft 11 is turned through half a revolution. This is accomplished by fixing on the shaft 11, underneath the motor switch operating electro-magnets, a disk 66 having at diametrically opposed points thereon pairs of lugs 67 and 68, projecting laterally from both sides thereof. These lugs are triangular in cross section, one apex or ridge of each lug being flush with the periphery of the disk. On the under side of the armature 58 is arranged a swinging dog 69, the free end of which lies between and is pinned to ears 70 on the armature, thereby permitting vertical swinging movements of the dog. The armature is provided with additional lugs 71 lying on opposite sides of the dog near the free end of the latter so as to prevent the dog from swinging or twisting sidewise. The dog lies just below the pivotal axis of the armature, so that it swings with the armature through a small angle from one side to the other of a vertical plane containing the pivotal axis of the armature. The dog 69 has on the under side, near the free end, a V-shaped nose 72, and it may also be provided with a pin 74 extending through the same and projecting on opposite sides thereof just above the nose. The disk 66 lies in the vertical plane containing the pivotal axis of the armature, which is also the plane of the dog 69 when the switch is in its neutral position. The parts are so proportioned that the nose of the dog may either rest on the edge of the disk 66 or lie on one side or the other thereof, with one end of the projecting pin 74 resting on the disk edge.

With the parts in the positions illustrated in Fig. 1, with the nose of the dog on the righthand side of the disk 66, the motor switch will remain in the position illustrated, even though the electro-magnets 57 have been deenergized, because the dog 69 acts as a lock bearing against the disk 66 and preventing the switch opening device consisting of the bent rod 61 and the spring 65 from swinging the switch into its open position. However, assuming that the disk 66 is turning in the counter-clockwise direction in Fig. 2, when the nose 72 on the dog reaches the lug 67 on the corresponding side of the disk, it rides up on one of the inclined faces of the lug until it rises to the extreme periphery of the disk. As soon as this occurs, the spring actuated switch opener comes into play, forcing the roller 60 on the armature 58 into the angle of the V in the rod 61 and opening the switch and simultaneously shifting the dog into a vertical position in which it rests on the edge of the disk ready to be swung to either side of the disk, depending upon whether the magnets 56 or 57 are the next to be energized.

The dog 69 serves an additional purpose. On top of the motor switch operating device is a switch comprising a spring arm 75 anchored at one end lying above a spring arm 76, also anchored at one end. The member 76 is connected to the dog 69 by a suitable link or strut 77. The parts are so proportioned that when the nose of the dog is resting on the periphery of the disk, the switch arm 76 is pressed up against the arm 75 which is caused to be deflected upwardly somewhat; the switch being closed and its two members serving as springs under tension and adapted to throw the dog 69 down and simultaneously open the circuit whenever the dog is oscillated to carry its nose to one side or the other of the disk 66. In this way the energizing circuits for the actuating magnets 56 and 57 are completed so far as the switch 75, 76 is concerned, whenever the motor stops, it remaining only for the contact 18 to engage either of the terminal screws 19 and 20, in order to start the motor in forward or reverse, as the case may be.

The operation of the system just described will now be explained. It may be assumed that in the drawings the motor is just about to stop with the draft fully open and the check damper fully closed, the disk 66 needing to turn only through a small angle in the counter-clockwise direction, in order to lift the nose of the dog 69 level with the periphery of the disk and permit the spring actuated motor switch opener to throw the motor switch into its neutral position. As soon as the motor switch opens, everything remains at a standstill until the temperature of the atmosphere by which the thermostat is influenced rises sufficiently to cause it to take control. If it be that there is no fire in the furnace and a fire is started, nothing will happen until the temperature of the room in which the thermostat is located comes somewhere near the desired maximum temperature. Then the thermal element 17 swings a little toward the right, as viewed in Fig. 3, closing the gap between its contact piece 18 and the terminal screw 20. Perhaps it should have heretofore been stated that the distance between the inner ends of the terminal screws is only a few thousandths of an inch greater than the overall thickness of the thermal element in the region of its contact piece 18, so that contact can be made with only one of the terminal screws at a time. With the room cold, contact is with the lefthand terminal screw 19 in Fig. 3. As shown by the diagram in Fig. 1, the terminal screw 19 is connected to the contact 46 of the limit switch through a wire 78. However, this contact is out of engagement with its cooperating contact 49, and therefore, no current can flow through any circuit which might otherwise have been established through the thermostat device. However, after the fire has developed sufficiently to cause the thermal element to swing to the right in Fig. 1 and make contact with the terminal screw 20, a circuit is completed from ground through the thermal element 17, through the terminal contact screw 20, the wire 79, the contacts 45 and 48 of the limit switch, wire 80, coils of the electromagnets 56, wire 81, switch members 75 and 76, and wire 82 to one terminal of the transformer secondary 15. The other terminal of the transformer being grounded, the circuit for the electro-magnets 56 is completed and the armature 55, which was occupying its neutral position, is drawn up by the electro-magnets 56. Thus, the motor switch is closed in a manner to cause the motor to operate in the direction to turn the gear segment 14 in the counter-clockwise direction, and the disk 66 in the clockwise direction, as viewed in Fig. 2. As soon as the disk 66 has traveled far enough to permit the nose of the dog to drop down beside the disk, as shown in Fig. 2, the armature is locked to hold the motor switch closed, but the circuit through the electro-magnets is interrupted at the switch members 75 and 76. This interruption of the circuit is important because if a continuous flow of current through the temperature responsive member of the thermostat were permitted, it would become heated by the current and no longer be accurately responsive to the temperature of the surrounding atmosphere. During the running of the motor the shaft 2 is being turned so as to rock the beam 1 through a small angle and begin winding the strap 41 upon the hub 42. When the disk 66 has completed a half-turn, one of the lugs 68 engages with the nose 72 on the dog, lifting the dog and causing the motor switch to be opened. By the time that the motor switch has been opened and the motor stopped, the lug 53 on the gear segment 14 has moved far enough away from the swinging member 47 of the limit switch to permit this member to be brought into its central or neutral position in which each of the movable contact pieces 48 and 49 engages with its cooperating stationary contact piece. The winding of the strap on the hub of shaft 2 causes the sliding rod 27 to be drawn down and the wedge member 30 to force the upper end of the carrier for the terminal screw contact pieces 19 and 20 toward the right, as viewed in Figs. 1 and 3, thereby again opening a gap between terminal screw 20 and the corresponding contact 18. Nothing further happens until this newly created gap has been closed, whereupon the cycle just described will be repeated and the rocker beam 1 will be turned a little farther in the direction that will cause the draft to be reduced. This cycle may be repeated as many times as is desired. For example, there may be as many as a dozen steps or stages in moving the gear segment on the shaft 2 from one limit to the other. Various effects may, of course, be obtained throughout the course of such a series of steps or stages. If desired, the first six steps or stages could be employed progressively to shut off the draft. Then, the last six steps or stages could be employed gradually to open the check damper.

It will be seen that whenever the thermal element of the thermostat fails to move far enough ahead to prevent the closing of the gap between the same and the trailing terminal screw, the rotation of the motor will be reversed because, except when the gear segment is at either limit of its movement, the limit switch is closed, and therefore, whenever the thermal element 17 makes contact with the screw 19, the circuit is completed through the limit switch members 46 and 49, through the wire 84 to the coils of the electromagnet 57 and from there through the wire 81, switch members 75 and 76, and wire 82 to the secondary of the transformer. If the relative shifting movements of the terminal screw contacts and the thermal element 17 for any stage or step are such that the circuit is interrupted at both terminal screws, the shifting of the draft device or check damper, or both, depending upon the manner in which the multiple stages or steps are employed, ceases until contact is again established with one or the other of the terminal contact screws.

With my improved system, very close temperature regulation can be obtained, something which is impossible where the draft and check devices are simply closed or opened to their full extent as determined by their adjustment in any particular installation; the control of the fire beginning at any convenient room temperature below the maximum temperature desired, and thereby preventing the accumulation, in the heating system, of an excessive amount of heat energy which will be delivered into the room after the maximum temperature has been reached and thereby cause the room to become much hotter than is desired. Not only are unduly high temperatures avoided, but as long as the fire is in condition to permit a sufficient flow of air therethrough, there need be no excessive drop in room temperature. Should the temperature drop more than a few degrees, it is evidence that the grate needs shaking or that the fuel should be replenished; and, when the deficiency in this respect is remedied, the automatic control is resumed without further care or effort on the part of the user. Always, when necessary, the full range of the draft and check devices may be utilized and they are not restricted to alternate complete closures and partial openings as is the case where the draft and check devices must initially be adjusted to utilize less than, and perhaps only a small fraction of, the whole range of control that would otherwise be afforded.

The spread between minimum and maximum room temperatures to enable the full range of draft and check control to be carried out varies greatly with different kinds of fuels and different types of heating systems. As already stated, in some systems there is so much water and metal that must be heated, that the temperature in a room may rise a good many degrees above the desired maximum if the regulation is performed in the ordinary way. By employing the adjustable wedge device with the graduated scale, I make it possible to vary the spread between the minimum temperature at which control of the fire begins and the maximum temperature desired. By adjusting the wedge device, the transition from a condition of full draft, throughout the entire series of steps or stages, to a condition of full check, may be carried out while the room temperature varies only two or three degrees if the conditions are such that room temperature responds very quickly to changes in the condition of the fire. On the other hand, the low temperature at which regulation is to begin may be eight or ten degrees below the desired maximum, so that the room temperature may rise as much as ten degrees while the entire series of steps or stages are carried out through the complete draft and damper range.

Where the thermostatic controller is not far from the shaft carrying the rocker beam, the means just described for synchronizing the movements of the rocker beam with movements of the screw contact terminals in the thermostatic device is satisfactory, but if the distance be great or it be necessary for the wire 39 to turn corners, it may be advisable to employ electrical instead of mechanical means for bringing about this synchronization. I have illustrated such means in Figs. 8 to 14. The system as a whole requires no change, but only the means for moving the frame that carries the contact terminal screws. Thus, for example, the frame that carries the terminal contact screws 19 and 20 in the temperature responsive switch may have an upwardly extending finger 85 instead of the lateral projection 26 in the form previously described. This finger may engage with any suitable actuator therefor. In the arrangement shown, the engagement is with a face cam 86 fixed on one end of a rotatable shaft 87 mounted above the switch device. This shaft is shown as having fixed thereon two toothed actuating wheels 88 and 89 and a toothed locking wheel 90 positioned between the other two. Each of the wheels 88 and 89 has as many similar teeth as there are steps or stages of control, together with a broad tooth 91. The wheel 90 is provided with a radially projecting stop pin 92. Above each of the wheels 88 and 89 is an electro-magnet, these being indicated at 94 and 95 respectively. Below each electro-magnet is a vertically swinging armature 96 provided with a plunger 97 extending up into the interior of the corresponding coil. Hung from the lower ends of the armature plungers or cores are links in the form of narrow, flat plates 98 and 99, respectively. As best shown in Fig. 9, each link has therein an oblong hole or cam slot 100 through which the shaft 87 passes. These cam slots are oppositely disposed so that when one armature is drawn up upon the energization of the overlying coil, the corresponding link is raised and, at the same time, swung upwardly; while upon the energization of the other coil, the other link is raised and swung forwardly. These movements of the links permit laterally projecting pins 101 on the lower ends thereof to engage the teeth on the adjacent wheel 88 or 89, as the case may be, and cause the shaft 87 to be turned, in one direction or the other, through steps equal to the angular length of a tooth. There is a tension spring 102 between the pin 101 on the link 98 and the corresponding armature which swings the link forward far enough, upon the lowering of the link, to place the pin in position to engage the next tooth when the armature is again energized. The link 99 is similar to the link 98, but because the cam slot in the same is oppositely disposed relatively to the slot 102, this link drives the shaft 87 in the opposite direction from the turning movements caused by the link 98. The link 99 has associated therewith a spring 104 that swings the link rearwardly past center when the armature drops and brings the pin on the link into position to take a new hold on the toothed wheel 89 when the armature is again raised.

Whenever the shaft 87 is turned until the pin on the active link or driving pawl reaches the wide tooth 91 on the toothed wheel with which it cooperates, the shaft has reached one limit of its oscillatory movement; for, if the same electro-magnet which has been driving it is again energized, the pawl associated therewith simply rides on top of the wide tooth and takes no hold on the toothed wheel. It will be seen that this arrangement insures that if one of the pawls should jump over one of the teeth of the corresponding wheel and thus bring the shaft 87 out of synchronism with the draft and check devices, correction will automatically be made and proper timing be re-established when the shaft is again turned back to the other limit of its movement.

The wheel 90 is a locking wheel with which a detent 105 cooperates to hold the shaft 87 in any angular position into which it may be turned. When the shaft is rotated in one direction, the pin 92 eventually strikes against the free end of the detent, thereby preventing any further rotation in that direction. When the shaft is rotated in the opposite direction, a condition is finally created in which the pin 92 strikes against a rearwardly facing shoulder 106 on the under side of the detent. This prevents further rotation of the shaft in that direction.

As the shaft 87 turns step by step, the face cam 86 is also turned in the same manner and, therefore, progressively presses the finger 85 toward the left, as viewed in Fig. 11, or permits the resiliency of the members 22 to carry the finger toward the right as the cam face recedes, depending upon the direction in which the shaft is rotated. It will thus be seen that if the electro-magnets 94 and 95 are energized at the proper times, the terminal screw contacts 19 and 20 are moved sidewise step by step, in the same manner as is done through the action of the wedge device in the first form of the invention.

In Figs. 13 and 14 there is illustrated a simple arrangement for controlling the energization of the electro-magnets 94 and 95. Near the shaft 11 and in the vicinity of the disk 66 is located a fixed contact 107. Between this fixed contact and the disk is a spring arm 108 anchored at one end, as indicated at 109 and having at its free end a contact 110 in position to be engaged with the contact 107. Normally, the resiliency of the spring arm 108 holds the contact 110 away from the contact 107. The spring arm 108 has thereon, opposite the disk 66, a projecting lug 111 having sloping faces meeting in a ridge. One of each pair of lugs or projections on the disk 66 that serve to raise the dog 69 is elongated, as indicated at 67a and 68a, in order to extend across the arm 108. The parts are so proportioned that midway in each half revolution of the disk 6, one of these elongated lugs engages with the lug 111 and causes the contact 110 to be engaged with the contact 107.

Also, on the shaft 2 is a loose disk 112 having thereon a radial arm 114 carrying on its outer end a contact piece 115. The free end of the arm 114 lies between two stationary contacts 116 and 117 spread apart a distance somewhat greater than the thickness of the contact 115, whereby the latter engage with either of the first two contacts, but not with both at the same time. Suitable means for frictionally holding the member 112 against turning movements relatively to the shaft 2 are provided, whereby, whenever the shaft turns, the member 112 turns with it until arrested through engagement of its contact with one of the stationary contacts 116 and 117. Thereafter, while the shaft continues to turn in the same direction, there is no further movement of the member 112. But, when the shaft 2 begins to turn in the opposite direction, the member 112 is carried along with it through the limited angle necessary to carry the contact 115 away from the stationary contact with which it was engaged and against the other of the two cooperating stationary contacts.

The wiring in Figs. 11 and 14 includes two wires 118, 119 which may be assumed to be connected to the terminals of the secondary of the transformer; the wire 118 being grounded, and the wire 119 being connected to the contact 110. The stationary contact 107 is connected to the contact 115 by a wire 120. Stationary contact 116 is connected by a wire 121 to one terminal of the electro-magnet 94; the other terminal of this coil being grounded through wire 122. The stationary contact 117 is connected to one terminal of the coil of the electro-magnet 95 through a wire 123; the other terminal of this coil being grounded through the wire 122. It will thus be seen that when the motor circuit is closed so as to cause the shaft 2 to turn in one direction, say the counter-clockwise direction, as viewed in Fig. 14, one of the two switches in the energizing circuit for the electro-magnet 94 is closed while the other (contacts 110 and 107) is open. However, after the disk 66 has made a quarter turn, one of the long projections on the same engages with the projection 111 on the switch arm 108 and forces the contact over against contact 107. Thus, the second of the two switches just referred to is closed and the electro-magnet 94 is energized. As the disk 66 continues to the end of its half turn, the switch arm 108 is released and springs back to its normal position, opening the circuit for the electro-magnet 94. However, this circuit has remained closed long enough for the pawl and ratchet mechanism actuated by this electro-magnet to turn the shaft 87 through one step. As long as the circuit to the motor continues to be completed in a manner to cause the motor to turn in the same direction, the electro-magnet 94 is energized once during each running cycle of the motor. As soon as the motor is caused to turn in the opposite direction, the member 112 on the shaft 2 is shifted so as to move its contact 115 away from the contact 116 and into engagement with the contact 117. Now, whenever the contact 110 meets the contact 107, the energizing circuit for the coil of the electro-magnet 95 is completed, and the turning movements of the shaft are then reverse of what they were before.

In the arrangement illustrated, the disk-like member 112 bears at one side against a collar 124 fixed on the shaft 2, while a friction disk or shoe 125 engages with the opposite side or face. Between the friction shoe 125 and a collar 126 adjustable along the shaft 2, is a compression spring 127 which causes the part 112 to be yieldingly clamped between the collar 124 and the shoe 125.

It will thus be seen that I have provided simple and reliable means for moving a controlling member for a heater or other apparatus, mechanism, or device step by step, backward and forward, in sensitive response to rise and fall in the temperature of the master controller; and that while the movement of said controlling member may proceed step by step from one limit to the other, the movement may be stopped at any point or the controlling member may be caused to retrace one or more of its steps, if temperature conditions require it.

It will also be understood that while I have referred to a range of twelve steps in each direction and have illustrated the mechanism for electrically adjusting the master switch through exactly twelve steps, the number and lengths of the steps are matters of choice and may be varied as desired. Furthermore, while I have not illustrated any means for varying the temperature range through which the electrically-controlled master switch may be effective, it is obvious that provision for such adjustment may easily be made. Thus, for example, by employing interchangeable cams in which the slopes of the working faces are steeper or less steep than that of the cam illustrated in Figs. 11 and 12, the same effect may be obtained as through the changing of the inclination of the wedge member 39 in the form illustrated in Fig. 1. Another way of accomplishing the same end is to substitute a pinion for the cam on the shaft 87 and engage it with rack teeth on the bar 27 in the form of controller shown in Figs. 1 to 4.

Therefore, while I have illustrated and described in detail only a single preferred form of my invention, together with a single modification in the operating means for the control of the temperature-responsive switch, I do not desire to be limited to the exact structural details thus illustrated and described; but intend to cover all forms and arrangements which come within the definitions of my invention constituting the appended claims.

I claim:

1. In combination, heat regulating means, an intermittently operated power unit for operating said heat regulating means, a temperature sensitive member having oppositely disposed electrical contacts, a pair of spaced electrical contacts carried by a movable member so as to confront said first named electrical contacts, means on said power unit for imparting movement to said movable member and its confronting contacts relative to said first named electrical contacts, an electro-magnet for starting said power unit, a rocking armature for said electro-magnet, a dog movably carried by said armature, a disc having lugs thereon rotatable by said power unit in the path of said dog, said dog riding said disc and normally disposed in the path of said lugs, electric circuit breaking means in the path of said dog to make the circuit for said electro-magnet when contacted by a lug on said disc and break the circuit when the dog drops intermediate said disc lugs to cut the temperature sensitive member from said circuit, a three-way electric switch actuated by said electro-magnet for energizing, de-energizing and reversing said power unit and operable responsive to said temperature sensitive member and movable member connected in the circuit therewith, electrical connections between said temperature sensitive member and opposing movable terminal member and said electro-magnet including said three-way switch, limit switches in said circuit for controlling the range of movement of said heat regulating means and the position of said movable member.

2. The combination with a heating system, of regulating means including intermittently operated power means and a heat control member adapted to be moved back and forth by said power means between predetermined limits constituting a predetermined number of a series of equally divided stepped positions, switching means for starting and stopping said power means operating in either direction, locking means to insure operation of said power means through one of said equally divided stepped positions of said predetermined limits, and means sensitive to temperature changes for initiating said switching means to start said power means and said regulating means for each of said equal divisions of step movement.

3. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, an electric circuit, means sensitive to temperature changes in said electric circuit for initiating said mechanism to start operating said power means and said regulating means for each of said equal divisions of step movement, and means operated by said power means for removing said temperature sensitive means from said circuit after each of said predetermined equal divisions of step movements has been initiated.

4. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, an electric circuit, means sensitive to temperature changes in said electric circuit for initiating said mechanism in starting said power means and said regulating means for each equal division of step movement, means operated by said power means for removing said temperature sensitive means from said electric circuit after each of said predetermined equal division of step movement have been initiated, and means for holding said mechanism locked in position while each of said divisions of step movement is in progress, means for unlocking said mechanism each time said equal step division has been completed.

5. The combination with a heating system, of regulating means including intermittently operated power means and a heat control member adapted to be moved back and forth by said power means between predetermined limits constituting a predetermined number of a series of equally divided stepped positions, switching means for starting and stopping said power means operating in either direction, locking means to insure operation of said power means through one of said equally divided stepped positions of said predetermined limits, a circuit contact member, an electric circuit, means sensitive to temperature changes in said electric circuit and having movement to cooperate with said circuit contact member for initiating said switching means to start said power means and said regulating means for each of said equal divisions of stepped movement, and means operated by said power means for separating said circuit contact member and said temperature sensitive means during each of said equal step divisions of movement.

6. The combination with a heating system, of regulating means including power means and a heat control member adapted to be moved back and forth by said power means between predetermined limits constituting a predetermined number of a series of equally divided stepped positions, switching means for starting and stopping said power means for operating in either direction, locking means to insure operation of said power means through one of said equally divided stepped positions of said predetermined limits, an electric circuit, a circuit contact member, means sensitive to temperature changes in said electric circuit and having movement to co-operate with said circuit contact member, means sensitive to temperature changes for initiating said switching means to start said power means and said regulating means for each of said equal divisions of step movement, means operated by said power means for separating said circuit contact member and said temperature sensitive means during each of said equal divisions of step movement, and means for changing the extent of separation between said circuit contact member and said temperature sensitive means without changing said predetermined number of stepped positions.

7. The combination with a heating system, of regulating means including power means and a heat control member adapted to be moved back and forth by said power means between predetermined limits constituting a predetermined number of a series of equally divided stepped positions, mechanism actuated for starting and stopping said power means for operating in either direction through one of said equally divided stepped positions of said predetermined limits, an electric circuit, a circuit contact member, means sensitive to temperature changes in said electric circuit and having movement to cooperate with said circuit contact member, a flexible pull connecting means between said circuit contact member and said power means for moving said contact member in one direction, and means for keeping said flexible pull connection tensioned for moving said circuit contact means in the opposite direction, said flexible means being pulled by said power means for separating said circuit contact member and said temperature sensitive means during each of said equal divisions of stepped movement, said temperature sensitive means serving to start said power means and said regulating means for each of said equal divisions of stepped movement.

8. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, a base member, a temperature sensitive means supported by said base member, a substantially U-shaped flexible swinging frame member having the open end of U-parallel arms secured to said base member, a pair of opposing contacts cooperating with said temperature sensitive means and fixed to the closed end of said U-shaped frame member, and means operated by said power means for flexible said U-shaped frame member to separate contact with said temperature sensitive means during each of said equal divisions of stepped movement, the response of said temperature sensitive means serving to initiate said mechanism to start said power means and said regulating means for each of said equal divisions of stepped movement.

9. The combination with a heating system, of regulating means including power means and a heat control member adapted to be moved back and forth by said power means between predetermined limits constituting a predetermined number of a series of equally divided stepped positions, mechanism comprising a pair of opposed electro-magnets, and armature, said electro-magnets cooperating with said armature, a three way switch, said armature operating said three way switch, a rotatable indexing cam having a neutral position interposed by two positions for operating said armature and said three way switch in reverse direction for starting and stopping said power means for operating in either direction through one of said equally divided stepped positions of said predetermined limits, a two way switch in an electric circuit, means sensitive to temperature in said circuit, means actuated by said armature for closing said two way switch when at the neutral position of said indexing cam, a circuit contact member, said temperature sensitive means having movement to cooperate with said circuit contact member for initiating said mechanism to start said power means and said regulating means for each of said equal divisions of stepped movements, and means operated by said power means for imparting movement to separate contact of said contact member and said temperature sensitive means during each of said equal divisions of movement.

10. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, an electric circuit, a circuit contact member, means sensitive to temperature changes in said electric circuit and having movement to co-operate with said circuit contact member, a uniform reversing step by step motor comprising a pair of electro-magnets provided with armatures, ratchet pawls carried by said armatures, rotatably journalled ratchet wheels, one of said pawls having ratchet engagement to rotate one of said ratchet wheels in one direction and the other ratchet pawl having ratchet wheel engagement for rotating the other ratchet wheel in the opposite direction, an electrical current distributor operated by said power means, said distributor having a frictionally held directional contact selecting member for selecting either of said electro-magnets to be energized with an electrical impulse during said equal divisions of movement, and means actuated by said ratchet wheels to cause movement to separate contact of said circuit contact member and said temperature sensitive means during each of said equal divisions of stepped movement the response of said temperature sensitive means serving to initiate said mechanism to start said power means and said regulator means for each of said equal divisions of stepped movements.

11. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, an electric circuit, a circuit contact member, means sensitive to temperature changes in said electric circuit and having movement to co-operate with said circuit contact member, an electrical uniform step by step motor, an electrical current distributor operated by said power means having a frictionally held contact selector member for selecting the direction in which said step motor shall operate, camming means operated by said step motor for imparting movement in opposite directions to separate contact of said circuit contact member and said temperature sensitive means, and travel limit stop means for limiting the travel of said step motor in both directions to conform with the said predetermined number of said series of equally divided step positions, the response of said temperature sensitive means serving to initiate said mechanism to start said power means and said regulating means for each of said equal divisions of stepped movements.

12. The combination with a heating system, of regulating means including power means and a heat control member adapted to be moved back and forth by said power means between predetermined limits constituting a predetermined number of a series of equally divided stepped positions, mechanism actuated for starting and stopping said power means operating in either direction through one of said equally divided stepped positions of said predetermined limits, an electrical circuit, a circuit contact member, means sensitive to temperature changes in said electrical circuit and having movement to cooperate with said circuit contact member, an electrical uniform step by step motor, a pair of opposed contacts, an electrical current distributor operated by said power means, said distributor having a contact selector for selecting either of the said opposed contacts to determine the direction in which said step motor shall operate, means for limiting the current distributor circuit to a short impulse constituting only a fraction of the duration of said equal division of step movement, and camming means operated by said step motor for imparting movement in either direction to separate contact of said circuit contact member and said temperature sensitive member means, the thermal response of said temperature sensitive means serving to initiate said mechanism to start said power means and said regulating means for each of said equal divisions of stepped movements.

13. The combination with a heating system, of regulating means including power means and a heat control member adapted to be moved back and forth by said power means between predetermined limits constituting a predetermined number of a series of equally divided stepped positions, switch control means for starting and stopping said power means for operating in either direction, locking means to insure operation of said power means through one of said equally divided stepped positions of said predetermined limits, and means sensitive to temperature changes for initiating said switch control means to start said power means and said regulating means for each of said equal divisions of stepped movements.

14. The combination with a heating system, of regulating means including power means and a heat control member adapted to be moved back and forth by said power means between predetermined limits constituting a predetermined number of a series of equally divided stepped positions, a switch control mechanism for starting and stopping said power means for operating in either direction through one of said equally divided stepped positions of said predetermined limits, means for holding said mechanism locked in position while said equal division of step movement is in progress, means for unlocking said mechanism each time said equal step division has been completed, means sensitive to temperature changes for initiating said mechanism to start said power means and said regulating means for each of said equal divisions of stepped movements.

15. The combination with a heating system, of regulating means including power means and a heat control member adapted to be moved back and forth by said power means between predetermined limits constituting a predetermined number of a series of equally divided stepped positions, a switch control mechanism for starting and stopping said power means for operating in either direction through one of said equally divided stepped positions of said predetermined limits, means for holding said mechanism locked in position while said equal division of step movement is in progress, means for unlocking said mechanism each time said equal step division has been completed, means sensitive to temperature changes for initiating said mechanism to start said power means and said regulating means for each of said equal divisions of stepped movements, and means operated by said mechanism for rendering said temperature sensitive means ineffective after initiating said mechanism and during each of said equal step division movement.

16. The combination with a heating system, of regulating means including power means and a heat control member adapted to be moved back and forth by said power means between predetermined limits constituting a predetermined number of a series of equally divided stepped positions, a switch control mechanism for starting and stopping said power means for operating in either direction through one of said equally divided stepped positions of said predetermined limits, an electric circuit, a pair of opposed contacts in said circuit, means sensitive to temperature changes having movement to cooperate with said opposed contacts, camming means operated by said power means for moving to separate contact of either of said opposed contacts and said temperature sensitive means during each of said equal divisions of movement, means for changing the effective movement of said camming means to vary the extent of contact separation of said opposed contacts and said temperature sensitive means without changing said predetermined number of said equally stepped positions, said temperature sensitive means serving to initiate said mechanism to start said power means and said regulating means for each of said equal divisions of stepped movement.

LUDWIG HOLLAND-LETZ.